United States Patent [19]
Standke et al.

[11] Patent Number: 5,885,341
[45] Date of Patent: Mar. 23, 1999

[54] ORGANOPOLYSILOXANE-CONTAINING, WATER-BASED COMPOSITIONS CONTAINING GLYCIDAL ETHER, ACRYLIC AND/OR METHACRYLIC FUNCTIONAL GROUPS, PROCESS FOR THEIR PREPARATION, AND THEIR USE

[75] Inventors: Burkhard Standke, Lorrach; Roland Edelmann, Wehr; Albert-Johannes Frings, Rheinfelden; Michael Horn, Rheinfelden; Peter Jenkner, Rheinfelden; Ralf Laven, Niederdossenbach; Helmut Mack, Rheinfelden; Jaroslaw Monkiewicz, Rheinfelden, all of Germany

[73] Assignee: Huels Aktiengesellschaft, Marl, Germany

[21] Appl. No.: 927,283

[22] Filed: Sep. 11, 1997

[30] Foreign Application Priority Data

Sep. 26, 1996 [DE] Germany .................. 196 39 782.0

[51] Int. Cl.$^6$ .................. C09D 183/08; C09D 183/07; C09D 183/06

[52] U.S. Cl. .................. 106/287.11; 106/287.12; 106/287.14

[56] References Cited

U.S. PATENT DOCUMENTS

| | | | |
|---|---|---|---|
| 3,837,876 | 9/1974 | Mayuzumi et al. | 106/287.11 |
| 5,073,195 | 12/1991 | Cuthbert et al. | 106/2 |
| 5,196,054 | 3/1993 | Schmuck et al. | 106/2 |
| 5,367,019 | 11/1994 | Sawaragi | 524/780 |
| 5,629,400 | 5/1997 | Standke et al. | 528/38 |
| 5,679,147 | 10/1997 | Standke et al. | 126/287.11 |

FOREIGN PATENT DOCUMENTS

| | | | |
|---|---|---|---|
| 0 542 022 | 5/1993 | European Pat. Off. | |
| 0675128 | 10/1995 | European Pat. Off. | C07F 7/08 |
| 0 716 127 | 6/1996 | European Pat. Off. | |
| 0 716 128 | 6/1996 | European Pat. Off. | |
| 96 04339 | 2/1996 | WIPO | |

*Primary Examiner*—David Brunsman
*Attorney, Agent, or Firm*—Oblon, Spivak, McClelland, Maier & Neustadt, P.C.

[57] ABSTRACT

Organopolysiloxane-containing, water-based compositions which are essentially free from organic solvents, have a flash point of above 70° C. and liberate essentially no alcohols through hydrolysis on dilution with water, and which contain, as functional groups, glycidyl ether alkyl, acryloxy-alkyl and/or methacryloxyalkyl groups, where each silicon in the organopolysiloxane carries one functional group, as well to a process for the preparation of such organopolysiloxane-containing compositions and to their use.

19 Claims, No Drawings

5,885,341

ORGANOPOLYSILOXANE-CONTAINING, WATER-BASED COMPOSITIONS CONTAINING GLYCIDAL ETHER, ACRYLIC AND/OR METHACRYLIC FUNCTIONAL GROUPS, PROCESS FOR THEIR PREPARATION, AND THEIR USE

BACKGROUND OF THE INVENTION

1. Field of the Invention

The invention relates to organopolysiloxane-containing, water-based compositions which are essentially free from organic solvents, have a flash point of above 70° C. and liberate essentially no alcohols through hydrolysis on dilution with water, to a process for their preparation, and to their use. The organopolysiloxane-containing compositions are essentially free from solvents. The term solvent-free compositions here is taken to mean those which contain no purely organic aliphatic or aromatic hydrocarbons, halogenated hydrocarbons, glycols, glycol ethers, ethers, ketones, esters, amides and other nitrogen-containing compounds, sulfur compounds and nitro compounds, and proton- (or hydrogen-) free solvents in amounts of greater than 100 ppm by weight. By contrast, proton-containing agents, such as water, inorganic or organic acids, alcohols, such as methanol, ethanol, n- and i-propanol, and higher alcohols in this series, are not regarded as organic solvents hereinafter.

2. Background of the Invention

Organosilanes of the general formula $R^0$—$Si(OR^1)_3$, where $R^0$ is an organic group and $R^1$ is a methyl or ethyl group, have a wide variety of applications, for example as adhesion promoters, release agents, rheology improvers, crosslinking agents and hydrophobicizing agents.

For ecological, safety and economic reasons, there is an increasing trend to apply these compounds in aqueous form, which generally gives rise to the following problems:

Hydrolysis causes liberation of alcohols:

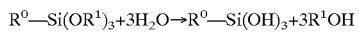

Free alcohols lower the flash point of the application solution, so that explosion-protected machines and special equipment have to be employed for the necessary processing steps. For toxicological reasons, the persons handling these compounds must additionally be trained and protected. Furthermore, disposal of the used application solution can cause difficulties due to the hydrolysis of alcohols. Special effluent treatment plants, as well as equipment for off gas and exhaust air treatment also are required.

The organosilane to be applied in water is not water-soluble:

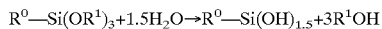

The hydrolyzate R—$SiO_{1.5}$ formed in accordance with this equation precipitates from the reaction mixture as a polymeric silicone resin, so that it is no longer available for the desired application. Although organosilanes having a highly hydrophobic character, for example alkylalkoxysilanes, in particular those having a long or branched carbon skeleton, hydrolyze only very slowly, they are insoluble in water.

Although monomeric organosilanes containing acrylic, methacrylic and glycidyl ether functional groups, for example methacryloxypropyltrimethoxysilane (DYNASYLAN® MEMO) or glycidyloxypropyltrimethoxysilane (DYNASYLANO® GLYMO) are substantially soluble in water, they tend to polycondense in aqueous solution and therefore do not have a long shelf life in aqueous solution. For example, GLYMO has a shelf life of about 10 days in water, while MEMO has a shelf life of only around 2 days (cf HUELS Product Information Sheet-. use of DYNASYLAN® organofunctional silanes, July 1994).

In order to obviate the known disadvantages described above, a wide variety of processes have been suggested in the past:

Some organosilanes, for example aminoalkylalkoxysilanes, while being stable in aqueous solution, have only restricted practicability in the wide range of possible uses of organofunctional silanes. The introduction of further organic functionalities, in particular a plurality of functionalities in one molecule based on organosilanes which are not stable per se in aqueous solution, is of considerable interest with regard to modification of the use properties.

A means for removing hydrolysis alcohols by distillation during the synthesis for the preparation of organosilane formulations from water-soluble organosilanes, for example from 3-aminopropyltriethoxysilane, is known. Water-based aminosilane systems which have a low alcohol content and otherwise contain no solvents are obtainable in this way and are commercially available, for example in the form of DYNASYLAN® 1151.

In the emulsion method, which likewise belongs to the prior art, the organosilane which is not compatible with water per se is emulsified in water with the aid of emulsifiers (EP A 0 442 098, European Patent 0 358 652 and U.S. Pat. No. 4,620,878). It is disadvantageous here that the products contain significant proportions of surfactants as emulsifiers and can liberate considerable amounts of alcohol.

The formulation of silane combinations in water is disclosed in U.S. Pat. No. 5,073,195. Silane formulations are prepared from a water-insoluble alkyltrialkoxysilane and a water-soluble silane, for example an aminoalkylalkoxysilane, in a molar ratio of from 1:2 to 3:1. As shown in the examples of this U.S. Patent, the formulations are prepared by substoichiometric hydrolysis of the silane mixture and stripping of the reaction mixture at 60° C. under reduced pressure, and for subsequent applications, silane formulations obtained in this way are also diluted with water. However, the dilution with water results in elimination of the alkoxy groups remaining after incomplete hydrolysis in the form of the corresponding alcohols. The silane cohydrolyzates thus contain free alcohols in significant amounts and may in addition liberate further amounts of alcohol through hydrolysis, which adversely affects the use properties of the products.

European Patent Application EP 675 128 describes the modification of water-based organosilane formulations with small amounts of organosilanes which are not water-soluble per se, for example methyltrimethoxysilane or vinyltrimethoxysilane. This process allows a molar ratio between the water-insoluble component and the water-soluble component of 1:2.5 to be achieved. If the content of water-insoluble silanes is higher, highly viscous products which gel over time are formed. Use properties essentially correspond to those of the abovementioned water-based organosilane formulations. By this process aqueous solutions which contain higher proportions of water-insoluble organosilanes and are stable for months are not obtainable. The preparation of aqueous solutions containing high proportions of highly hydrophobic silanes, for example isobutyltrimethoxysilane, is not possible by this process.

EP 0 716 127 and EP 0 716 128 disclose the preparation of water-soluble, solvent-free and essentially hydrolysis alcohol-free organosilane formulations based on a water-soluble silane (aminosilane) serving as "carrier silane" with high proportions of water-insoluble silanes (alkylsilanes, vinylsilanes or ureidosilanes). The water solubility of formulations is achieved by targeted cohydrolysis of aminosilanes with water-insoluble silanes, followed by neutralization of the amino function by means of acids and distillation of hydrolysis alcohols. However, the adhesion-promoting properties of these systems are of only limited acceptability for some applications. In addition, there is a need for organosilane systems which, when applied to a surface to be silanized, usually a mineral one, produce both hydrophobic and adhesion-promoting effects at the same time. There is therefore also a need for water-based and essentially solvent-free organosilane formulations which have a low alcohol content, can be employed, for example, instead of hydrophobicizing silanes, such as alkylalkoxysilanes, and likewise exhibit both a hydrophobicizing and a satisfactory adhesion-promoting action on a mineral surface to be silanized.

SUMMARY OF THE INVENTION

The object of the invention are essentially solvent-free, functional, water-based organosilane formulations which have the lowest possible content of free alcohols, have a flash point above 70° C., liberate essentially no alcohols through hydrolysis on dilution with water and, in particular, exhibit a hydrophobicizing and a satisfactory adhesion-promoting action.

It has been found that essentially solvent-free, water-soluble organopolysiloxane-containing compositions which contain, in particular, glycidyl ether functions and/or methacrylic and/or acrylic functions, also have a flash point of above 70° C. and liberate essentially no alcohols through hydrolysis on dilution with water have both good hydrophobicizing properties and excellent adhesion-promoting properties on application. The present organopolysiloxane-containing compositions further advantageously contain aminopropyl groups or hydrocarbon groups or amino-alkyl and hydrocarbon groups as further functional groups.

DETAILED DESCRIPTION OF THE INVENTION AND PREFERRED EMBODIMENTS THEREOF

The present invention relates to organopolysiloxane-containing, water-based compositions which are essentially free from organic solvents, have a flash point of above 70° C. and liberate essentially no alcohols through hydrolysis on dilution with water, and which contain, as functional groups, glycidyl ether alkyl and/or acryloxyalkyl and/or methacryloxyalkyl groups, where each silicon in the organopolysiloxane carries one functional group. The inventive organopolysitoxane-containing compositions preferably contain, as further functional groups, aminoalkyl groups or alkyl groups or aminoalkyl and alkyl groups, for example, from the general formulae I to IV.

The inventive organopolysiloxane-containing compositions are essentially free from organic solvents, but may contain small amounts of alcohols, in particular methanol and/or ethanol. The alcohol content in the organosiloxane-containing compositions is preferably less then 5% by weight, particularly preferably less than 1.5% by weight, very particularly preferably less than 0.5% by weight.

The organopolysiloxane-containing compositions preferably have a pH of from 1 to 8, particularly preferably from 3 to 6, very particularly preferably from 3 to 5. They advantageously contain a monobasic inorganic and/or organic acid and/or a derivative thereof The term derivative means for instance, a compound such as an alkali metal halide, in particular sodium chloride or potassium chloride, an alkali metal acetate, an alkali metal formate, an alkali metal nitrate or a compound of the amino groups in the organopolysiloxanes with inorganic or organic acid groups, as shown by the general formula V.

Advantageously, during the preparation of, the organopolysiloxane-containing compositions, an antifoaming agent, preferably a silicone resin suspension, can be added.

The inventive organopolysiloxane-containing compositions are advantageously obtainable by Mixing water-soluble organosilanes of the general formula I

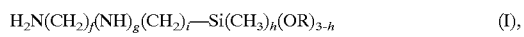

in which $0 \leq f \leq 6, g=0$ if $f=0$, $g=1$ if $f>1$, $0 \leq i \leq 6$, $0 \leq h \leq 1$ and R is a methyl, ethyl, propyl or isopropyl group, preferably aminopropyltriethoxysilane, with organosilanes which are water-soluble, but not stable in aqueous medium, of the general formula II

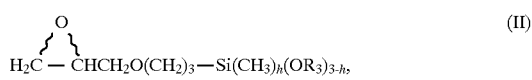

in which $0 \leq h \leq 1$, and R is a methyl, ethyl, propyl or isopropyl group, preferably glycidyloxypropyltrimethoxysilane, and/or organosilanes of the general formula III

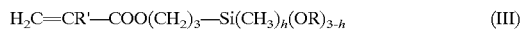

in which $0 \leq h \leq 1$, R is a methyl, ethyl, propyl or isopropyl group, and R' is a methyl or hydrogen group, preferably methacryloxypropyltrimethoxysilane, and water-insoluble organosilanes of the general formula IV

in which $0 \leq h \leq 1$, R is a methyl, ethyl, propyl or isopropyl group, and R" is a linear, branched or cyclic hydrocarbon group having 1 to 8 carbon atoms, preferably propyltrimethoxysilane, in the molar ratio M=a/(b+c+d), where a is the total of the molar amounts of the organosilanes of the formula I, b is the total of the molar amounts of the organosilanes of the formula II, c is the total of the molar amounts of the organosilanes of the formula III and d is the total of the molar amounts of the organosilanes of the formula IV, where $0 \leq M \leq 3$ and at least b>0 or c>0, preferably, for M=0, with a=0 and/or c=d=0 and $b \geq 1$, and preferably $0.5 \leq M \leq 3$, combining the mixture with a water/acid mixture, adjusting the pH of the reaction mixture to a value of from 1 to 8, and removing the alcohol already present and/or formed during the reaction.

The inventive organosilane polycondensates generally have the approximate structure shown in formula V, below. A verification for this structure using common methods of polymer analysis, however, was not successful due to the very high reactivity of the organofunctional siloxanes.

The organopolysiloxane-containing compositions thus advantageously and are presumed to conform to the general formula V

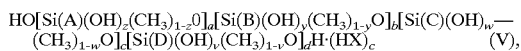
$$HO[Si(A)(OH)_z(CH_3)_{1-z}O]_a[Si(B)(OH)_y(CH_3)_{1-y}O]_b[Si(C)(OH)_w-\\(CH_3)_{1-w}O]_c[Si(D)(OH)_v(CH_3)_{1-v}O]_dH \cdot (HX)_e \quad (V),$$

in which A is an aminoalkyl group derived from the general formula I, B is a glycidyl ether alkyl group derived from the general formula II, C is an acryloxyalkyl or methacryloxyalkyl group derived from the general formula III, and D is an alkyl group of the general formula IV, HX is an acid, preferably a monobasic acid, where X is an inorganic or organic acid group, for example chloride, nitrate, formate or acetate, v=0 or 1, w=0 or 1, y=0 or 1 and z=0 or 1, and a+b+c+d≧4 and a≦e≦2a, where 0≦a/(b+c+d)≦3, in particular for a/(b+c+d)=0 where a=0 and/or c=d=0 and b≧1, and for 0.5≦a/(b+c+d)≦3.

The present invention furthermore relates to a process for the preparation of the inventive organopolysiloxane-containing compositions which comprises mixing a mol of water-soluble organosilanes of the general formula I, b and/or c mol of organosilanes of the general formulae II and/or III which are unstable in aqueous solution, and d mol of water-insoluble organosilanes of the general formula IV in the molar ratio 0≦a/(b+c+d)≦3, advantageously also for a/(b+c+d)=0 where a=0 and/or c=d=0 and b≧1, and preferably also for 0.5≦a/(b−c+d)≦3, combining the mixture with a water/acid mixture, where the amount of acid is selected so that the reaction mixture has a pH in the range from 1 to 8, and removing the alcohol already present and/or formed during the reaction.

In general, the inventive process for the preparation of said organosiloxane containing compositions is carried out as described in detail below.

Usually, water-soluble organosilanes of the general formula I are first mixed with organosilanes of the general formulae II and III which are not stable in water and with water-insoluble organosilanes of the general formula IV. The reaction mixture can then be metered into a water/acid mixture. Preferably, from 0.5 to 30 mol of water, particularly preferably from 1 to 5 mol of water, per mol of the organosilanes employed are used. The metering is preferably carried out in portions with periodic interruptions. However, the metering process can also be carried out continuously with periodic interruptions, or the discontinuous and continuous metering procedures can be combined with one another in any suitable manner.

The pH of the reaction mixture is advantageously adjusted to a value of from 1 to 8, preferably to a value of from 3 to 6, particularly preferably to a value of from 3 to 5. The acid component added is generally an inorganic or organic acid, preferably a monobasic acid, particularly preferably nitric acid or hydrochloric acid or acetic acid or formic acid, or a mixture of the abovementioned acids.

The reaction is generally carried out at a temperature in the range from 0° to 100° C., preferably at a temperature in the range from 10° to 80° C., particularly preferably at from 20° to 60° C. The reaction is advantageously carried out with stirring.

The alcohol already present and/or formed during the reaction is generally removed from the reaction mixture. The alcohol already present and/or formed during the reaction is preferably removed by distillation and at the same time water is added to the extent that alcohol is removed from the reaction mixture. The removal of the alcohol by distillation is preferably carried out under reduced pressure. The removal of the alcohol by distillation is preferably continued until a temperature which corresponds to the boiling point of water is reached at the top of the column.

An adjustment of the pH in the reaction medium can also be carried out during and/or after removal of the alcohols by distillation by adding an organic or inorganic acid, in particular a monobasic acid.

In the inventive process, the residual alcohol content in the organopolysiloxane containing compositions is preferably adjusted to less than 5% by weight, particularly preferably to less than 1.5% by weight, very particularly preferably to less than 0.5% by weight.

In order to reduce foam formation, an antifoaming agent, particularly preferably an aqueous silicone resin suspension, is preferably added before and/or during removal of the alcohol by distillation.

Cloudiness or precipitations sometimes arise in the product during or after completion of the distillation, frequently emanating from the antifoaming agent added. In order to obtain a clear product, the product obtained after removal of the alcohol by distillation is advantageously subjected to subsequent purification by sedimentation and/or filtration. The filtration and removal of the sediment can be carried out, for example, via a pressure filter, a separator, a decanter or similar equipment.

Products prepared by the inventive process are stable in the form of aqueous solutions. The inventive organopolysiloxane-containing compositions can be diluted with water in any ratio, they liberate essentially no hydrolysis alcohols on addition of water, have a flash point of above 70° C., preferably above 95° C., particularly preferably above 98° C., and are essentially free from organic solvents and surfactants as emulsifiers. In addition, the water-soluble, multifunctional, oligomeric silane systems according to the invention or prepared according to the invention are used, with significant advantages over products known hitherto, in particular for the silanization of mineral surfaces, for example in filler and pigment pretreatment for simultaneous production of adhesion-promoting and hydrophobicizing effects. The adhesion-promoting effects are produced by the amino and glycidyl ether and/or (meth)acrylate functions present in the oligomeric molecule. It is also possible for an optionally desired hydrophobicizing effect additionally to be improved by the optional presence of alkyl functions.

The inventive organopolysiloxane-containing compositions are thus preferably used especially for the hydrophobicization of surfaces, for the hydrophobicization of mineral building materials, for the protection of buildings and facades, for the coating of glass fibers, for the silanation of fillers and pigments, for improving the rheological properties of polymer dispersions and emulsions, for the hydrophobicization of textiles, leather, cellulose and starch products, as release agents, as crosslinking agents, in particular as adhesion promoters, and as paint and coating additives.

The invention is explained in greater detail by the examples below; it not, however, being limited thereto.

EXAMPLES

Reaction apparatus for all the following examples, including the comparative example Laboratory stirred reactor with a capacity of 2 liters, temperature-controllable, internal temperature measurement, liquid metering device, distillation bridge with head temperature measurement, product condenser, distillate receiver, laboratory pressure filter (capacity 2 liters).

The following process parameters apply to all the examples below, including the comparative example Foaming problems during distillation can be prevented by adding a few drops of a commercially available antifoaming agent based on aqueous silicone resin emulsions to the reaction solution. The slight turbidity resulting from addition of the antifoaming agent can be removed by filtration through a pressure filtration apparatus fitted with glass fiber filter (pore width <1 µm).

The products obtained in Examples 1 to 8 in accordance with the invention have the following properties in common The product is clear and infinitely miscible with water. The alcohol content is less than 0.5% by weight. The flash point of the products is above 95° C. and does not drop even on further dilution with water, since no further hydrolysis takes place and thus no further alcohols are liberated.

AMEO = 3-aminopropyltriethoxysilane,
MEMO = 3-methacryloxypropyltrimethoxysilane,
GLYMO = 3-glycidyloxypropyltrimethoxysilane,
PTMO = n-propyltrimethoxysilane Example 1
Preparation of a water-soluble hydrolyzate from 3-glycidyloxypropyltrimethoxysilane (GLYMO)

708 g of GLYMO are introduced into the apparatus described above, 162 g of water and 3.5 g of formic acid (85% strength) are mixed and metered in over the course of 15 minutes. During this addition, the temperature increases from 20° to 35° C. The batch is stirred at 60° C. for two hours. A methanol/water mixture is then distilled off over the course of 8 hours and at the same time replaced by the same amount by weight of water (pressure: 300–133 mbar; temperature: 42°–52° C). When the head temperature is about 50° C. at 133 mbar and the head product only contains water, the distillation is terminated, and the appropriate amount of water is added, giving a solution in which w(GLYMO)=40% in water.

Example 2
Preparation of a water-soluble cohydrolyzate from AMEO and 3-methacryloxypropyltrimethoxVsilane (MEMO) in various molar ratios 2a) AMEO/MEMO 1:1

216 g of water and 135.2 g of formic acid (85% strength by weight in water) are introduced into the apparatus described above and cooled by means of an ice bath. 442 g of AMEO and 496 g of MEMO are mixed and added via the metering device over the course of about 30 minutes. During this addition, the temperature rises from 10° C. to 25° C. The reaction mixture is stirred at 50° C. for two hours. 587 g of water are then metered in giving a 50% strength silane solution in water. An ethanol/methanol/water mixture is distilled off over the course of about 7 hours and at the same time replaced by the same amount of water by weight, so that the concentration of the solution remains constant (pressure- 300–133 mbar; temperatures 47°–52° C.). When the head temperature is about 50° C. at 133 mbar and the head product only contains water, the distillation is terminated.

2b) AMEO/MEMO 2:1

138 g of water and 26 g of formic acid (85% strength by weight in water) are introduced into the apparatus described above with a 500 ml stirred reactor and cooled by means of an ice bath 88.4 g of AMEO and 49.6 g of MEMO are mixed and added via the metering device over the course of about 30 minutes. During this addition, the temperature rises from 6° C. to 10° C. The reaction mixture is stirred at 45° C. for 2 hours. An ethanol/methanol/water mixture is distilled off over the course of about 4 hours and at the same time replaced by the same amount of water by weight, so that the concentration of the solution remains constant (pressure: 140–100 mbar; temperature: 42° C.). When the head temperature is about 40° C. at 100 mbar and the head product only contains water, the distillation is terminated.

2c) AMEO/MEMO 1:2

16.2 g of water and 6.8 g of formic acid (84% strength by weight in water) are introduced into the apparatus described above with a 250 ml stirred reactor. 22.1 g of AMEO and 49.6 g of MEMO are mixed and added via the metering device over the course of about 30 minutes. During this addition, the temperature rises from 20° C. to 40° C. The reaction mixture is stirred at 40° C. for 3 hours. 50 g of water are then metered in, giving a 50% strength silane solution in water. An ethanol/methanol/water mixture is distilled off over the course of about 2 hours and at the same time replaced by the same amount of water by weight, so that the concentration of the solution remains constant (pressure: 200–100 mbar; temperatures 40°–44° C.). When the head temperature is about 40° C. at 100 mbar and the head product only contains water, the distillation is terminated.

Example 3
Preparation of a water-soluble cohydrolyzate from AMEO, GLYMO, MEMO and PTMO in the molar ratio of 3:1:1:1

16.2 g of water and 10.2 g of formic acid (84% strength by weight in water) are introduced into the apparatus described above with a 500 ml stirred reactor. 33.2 g of AMEO, 11.8 g of GLYMO, 12.4 g of MEMO and 8.2 g of PTMO are mixed and added via the metering device over the course of about 2 minutes. During this addition, the temperature rises from 14° C. to 52° C. The reaction mixture is stirred at 50° C. for 2 hours. 70 g of water are then metered in, giving a 40% strength silane solution in water. An ethanol/methanol/water mixture is distilled off over the course of about 3 hours and at the same time replaced by the same amount of water by weight, so that the concentration of the solution remains constant (pressure, 300–133 mbar; temperature: 47°–52° C.). When the head temperature is about 50° C. at 133 mbar and the head product only contains water, the distillation is terminated.

Example 4
Preparation of a water-soluble cohydrolyzate from AMEO, GLYMO and PTMO in the molar ratio of 1:1:1

216 g of water and 53 g of formic acid (84% strength by weight in water) are introduced into the apparatus described above 176.8 g of AMEO, 188.8 g of GLYMO and 131.2 g of PTMO are mixed and added via the metering device over the course of about 30 minutes. During this addition, the temperature rises from 24° C. to 55° C. The reaction mixture is stirred at 60° C. for 1 hour 898 g of water are then metered in, giving a 30% strength silane solution in water. An ethanol/methanol/water mixture is distilled off over the course of about 6 hours and at the same time replaced by the same amount of water by weight, so that the concentration of the solution remains constant (pressure: 200–133 mbar; temperature: 42°–52° C.). When the head temperature is about 50° C. at 133 mbar and the head product only contains water, the distillation is terminated.

What is claimed as new and desired to be secured by Letters Patent of the United States is:

1. An organopolysiloxane-containing, water-based composition which is essentially free from organic solvents, has a flash point of above 70° C. and liberates essentially no alcohols through hydrolysis on dilution with water, and which contains, as functional groups, glycidyl ether alkyl and/or acryloxyalkyl and/or methacryloxyalkyl groups, where each silicon in the organopolysiloxane carries one functional group.

2. An organopolysiloxane-containing composition as claimed in claim 1, which contains, as further functional groups, aminoalkyl groups or alkyl groups or aminoalkyl and alkyl groups.

3. An organopolysiloxane-containing composition as claimed in claim 1, which has a pH of from 1 to 8.

4. An organopolysiloxane-containing composition as claimed in claim 1, which contains a monobasic inorganic and/or organic acid and/or a derivative thereof.

5. An organopolysiloxane-containing composition as claimed in claim 1, wherein the alcohol content in the organopolysiloxane containing composition is less than 5% by weight.

6. An organopolysiloxane-containing composition as claimed in claim 1, which contains a silicone resin suspension.

7. An organopolysiloxane-containing composition as claimed in claim 1, obtained by mixing water-soluble organosilanes of the general formula I

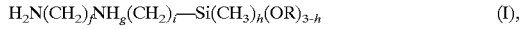

in which $0 \leq f \leq 6$, $g=0$ if $f=0$, $g=1$ if $f>1$, $0 \leq i \leq 6$, $0 \leq h \leq 1$ and R is a methyl, ethyl, propyl or isopropyl group, with organosilanes which are water-soluble, but not stable in aqueous medium, of the general formula II

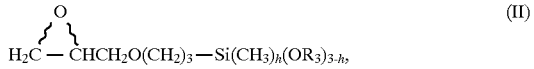

in which $0 \leq h \leq 1$, and R is a methyl, ethyl, propyl or isopropyl group, and/or organosilanes of the general formula III

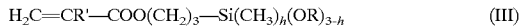

in which $0 \leq h \leq 1$, R is a methyl, ethyl, propyl or isopropyl group, and R' is a methyl or hydrogen group, and water-insoluble organosilanes of the general formula IV

in which $0 \leq h \leq 1$, R is a methyl, ethyl, propyl or isopropyl group, and R" is a linear, branched or cyclic hydrocarbon group having 1 to 8 carbon atoms, in the molar ratio $M=a/(b+c+d)$, where a is the total of the molar amounts of the organosilanes of the formula I, b is the total of the molar amounts of the organosilanes of the formula II, c is the total of the molar amounts of the organosilanes of the formula HII and d is the total of the molar amounts of the organosilanes of the formula IV, where $0 \leq M \leq 3$ and at least $b>0$ or $c>0$, combining the mixture with a water/acid mixture, adjusting the pH of the reaction mixture to a value of from 1 to 8, and removing the alcohol already present and/or formed during the reaction.

8. An organopolysiloxane-containing composition as claimed in claim 7, which conforms to the general formula V

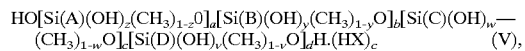

in which A is an aminoalkyl group derived from the general formula I, B is a glycidyl ether alkyl group derived from the general formula II, C is an acryloxyalkyl or methacryloxyalkyl group derived from the general formula III, and D is an alkyl group of the general formula IV, HX is an acid, where X is an inorganic or organic acid group, $v=0$ or 1, $w=0$ or 1, $y=0$ or 1 and $z=0$ or 1, and $a+b+c+d \geq 4$ and $a \leq e \leq 2a$, where $0 \leq a/(b+c+d) \leq 3$.

9. A process for the preparation of an organopolysiloxane-containing composition as claimed in claim 7, which comprises mixing a mol of water-soluble organosilanes of the general formula I, b and/or c mol of organosilanes of the general formulae II and/or III which are unstable in aqueous solution, and d mol of water-insoluble organosilanes of the general formula IV in the molar ratio $0 \leq a/(b+c+d) \leq 3$, combining the mixture with a water/acid mixture, where the amount of acid is selected so that the reaction mixture has a pH in the range from 1 to 8, and removing the alcohol already present and/or formed during the reaction.

10. A process as claimed in claim 9, wherein from 0.5 to 30 mol of water are added to the reaction mixture per mol of the organosilanes employed.

11. A process as claimed in claim 9, wherein the acid is a monobasic acid.

12. A process as claimed in claim 9, wherein the reaction is carried out at a temperature in the range from 0° to 100° C.

13. A process as claimed in claim 9, wherein alcohol already present and/or formed during the reaction is removed by distillation, and at the same time water is added to the extent that alcohol is removed from the reaction medium.

14. A process as claimed in claim 13, wherein the removal of the alcohol by distillation is carried out under reduced pressure.

15. A process as claimed in claims 13, wherein the removal of the alcohol by distillation is continued until a temperature which corresponds to the boiling point of water is reached at the top of the column.

16. A process as claimed in claim 9, wherein an antifoaming agent is added before and/or during the removal of the alcohol by distillation in order to reduce foam formation.

17. A process as claimed in claim 9, wherein the residual alcohol content in the organopolysiloxane-containing composition is adjusted to <5% by weight.

18. A process as claimed in claims 9, wherein the alcohol is removed by distillation and the product is subjected to further purification by sedimentation and/or filtration.

19. A method comprising applying the organopolysiloxane-containing, water-based composition as claimed in claim 1 to surfaces for hydrophobicization, to mineral building materials for hydrophobicization, to buildings and facades for protection, to glass fibers for coating them, to fillers and pigments for silanation, to polymer dispersions and emulsions for improving rheological properties, to textiles, leather, cellulose and starch products for hydrophobicization, to materials as release agents, as crosslinking agents, as adhesion promoters and as paint and coating additives.

* * * * *